No. 11,978. Reissued Apr. 1, 1902.

T. B. FAGAN.

MOWING MACHINE ATTACHMENT.

(Application filed Jan. 29, 1902.)

Witnesses
T. L. Mockabee
Alex. Scott

Inventor
T. B. Fagan
by Arthur W. Harrison
Attorney

THE NORRIS PETERS CO., WASHINGTON, D. C.

UNITED STATES PATENT OFFICE.

THOMAS B. FAGAN, OF VANWERT, OHIO, ASSIGNOR, BY MESNE ASSIGNMENTS, TO THE SIDE DELIVERY BUNCHER COMPANY, OF TOLEDO, OHIO, A CORPORATION OF OHIO.

MOWING-MACHINE ATTACHMENT.

SPECIFICATION forming part of Reissued Letters Patent No. 11,978, dated April 1, 1902.

Original No. 643,048, dated February 6, 1900. Application for reissue filed January 29, 1902. Serial No. 91,805.

*To all whom it may concern:*

Be it known that I, THOMAS B. FAGAN, of Vanwert, in the county of Vanwert and State of Ohio, have invented a new and useful Improvement in Mowing-Machine Attachments, of which the following is a specification.

My invention is in the nature of an attachment to a mowing-machine designed to be secured in the rear of the finger-bar of any machine for the purpose of gathering the grass or clover into bunches and discharging the bunches behind the truck of the mower, where it is out of the way of the team on the next round; and it consists in the peculiar construction and arrangement of the devices which I will now proceed to describe, reference being had to the accompanying drawings, in which—

Figure 1:
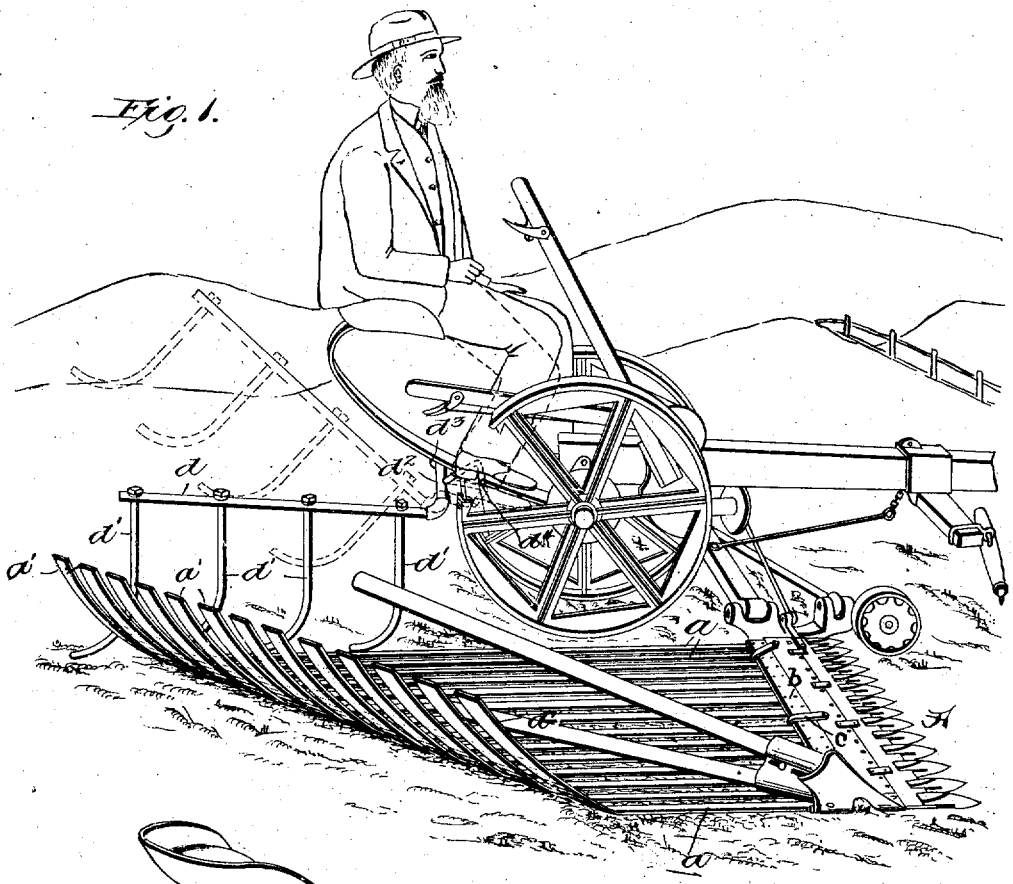
Figure 2:
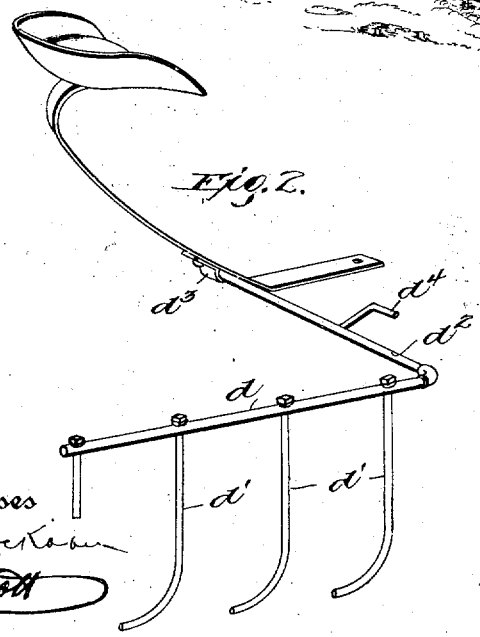
Figure 3:
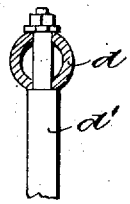

Figure 1 is a perspective view of a mower having my invention applied. Fig. 2 is a perspective view of the buncher and dropper, and Fig. 3 is a detail.

In the drawings, A represents the finger-bar of any ordinary mower. To this is applied in rear of the same a gathering and turning device for the grass, consisting of a series of flat steel bars *a*, connected together in front by a cross-bar *b* and detachably secured to the rear of the finger-bar by yokes *c* with suitable bolts or set-screws. The flat steel bars are shortest at the outer end of the finger-bar and longest near the inner end and terminate at their rear ends on a diagonal line, their rear ends being turned up, as shown at *a'*, and twisted laterally, so that the planes of their turned-up ends are not at right angles to the line of draft, but occupy an inclined or diagonal position thereto, which causes them to exert a turning action upon the grass after the principle of the moldboard of a plow. This causes the grass to be gathered as it is cut and directed inwardly toward the driver's seat, when it is held by a buncher and dropper. This latter consists of an arm *d*, having any suitable number of teeth, tines, or prongs *d'*, extending therefrom at right angles down toward the ground and arranged with their lower ends to drag upon the ground beside the longest one of the flat metal strips, so as to act as a gate to prevent the grass from being discharged from the gatherer until sufficient has accumulated to form a bunch for a windrow. When this occurs, the arm *d* is raised, as shown by dotted lines, and the grass is allowed to be discharged with a side delivery behind the truck-wheels of the mower. The gate-arm *d* (see Fig. 2) is rigidly connected to or formed on a rock-shaft $d^2$, journaled in bearings $d^3$ near the base of the driver's seat, and this rock-shaft has a foot-treadle $d^4$ upon the opposite side of the rock-shaft from the gate-arm, by pressing upon which treadle with his foot the driver is able at will to lift the gate and discharge the bunch of grass.

The tines or prongs *d'* of the gate have their lower ends bent, as shown, to enable them to trail along on the ground without catching and hanging. To enable the machine to turn corners or to be backed, these tines or prongs are not rigidly attached to their carrying-arms *d*, but are loosely swiveled thereon at the top, as shown in Fig. 3, so that the said tines may turn about their vertical axes as their lower ends trail on the ground when the machine is turning. This prevents these teeth from catching into obstructions and permits the load of grass to be held on the gatherer even in turning at a turning row, so the bunch of grass need not be dumped at the turning row, where it would be in the way of the feet of the team.

The flat bars or slats *a* are thin, as shown in Fig. 1, and are of a material which is resilient in this form. Their upturned rear portions are twisted so as to face somewhat toward the discharge side, and each individual slat therefore gives an initial movement of the grass toward the next longer slat, and they coöperate in turning and rolling the bunch toward the delivery side. This coöperation is facilitated by the resilience of the slats, which causes their upturned ends, if pushed backward by the bunch, to tend to spring forward again in a direction that tends to throw or roll the bunch toward the delivery side as soon as the pressure is reduced.

Having thus described my invention, what I claim is—

1. A side-delivery attachment for mowingmachines, comprising in its construction a plurality of thin, flat, resilient slats gradually and uniformly increasing in length from one side to the other of the attachment and having their front portions in a substantially uniform flat plane to rest on the ground, and having their rear portions turned upwardly and twisted in a direction to present their concave faces toward the longer or discharge side of the attachment.

2. The combination with a mower having a side-delivery gatherer comprising a series of bars extending rea-wardly from the finger-bar and having upwardly turned free ends, of a gate parallel with the delivery side thereof and movably supported to enable it to be moved away to permit the discharge of a bunch of grass.

3. In a mower, the combination with a gatherer arranged behind the cutter-bar and composed of parallel slats turned up at their rear ends on a diagonal line; of a gate composed of an arm having pendent teeth or tines arranged along the line of draft parallel with the delivery side of the gatherer, said arm being made adjustable to be lifted from the gatherer to discharge the bunch of grass substantially as described.

4. The combination with a mower having a gatherer with a side delivery; of a vertically-working gate having swiveling pendent prongs or teeth curved at their lower ends substantially as and for the purpose described.

In testimony whereof I have signed my name to this specification in the presence of two subscribing witnesses.

THOMAS B. FAGAN.

Witnesses:
GERTRUDE HARSHMAN,
C. E. REDRUP.